United States Patent [19]
Mueller, Jr.

[11] 4,150,586
[45] Apr. 24, 1979

[54] CONTROL MECHANISM

[75] Inventor: Otto Mueller, Jr., Detroit, Mich.

[73] Assignee: Massey-Ferguson Inc., Detroit, Mich.

[21] Appl. No.: 720,299

[22] Filed: Sep. 3, 1976

[51] Int. Cl.² ........................... G05G 5/06; F16H 1/44
[52] U.S. Cl. ...................................... 74/532; 74/710.5
[58] Field of Search ....................... 74/710.5, 541, 542, 74/532, 533, 483 PB, 527, 539

[56] References Cited

U.S. PATENT DOCUMENTS

| | | | |
|---|---|---|---|
| 1,424,081 | 7/1922 | Cline et al. | 74/532 |
| 1,491,717 | 4/1924 | Mace | 74/532 |
| 1,723,901 | 8/1929 | Todd | 74/710.5 |
| 2,126,579 | 8/1938 | Roethel | 74/532 X |
| 2,149,262 | 3/1939 | Ahler | 74/541 |
| 2,205,682 | 6/1940 | Claud-Mantle | 74/541 X |
| 2,206,909 | 7/1940 | Lustig | 74/532 X |
| 2,485,015 | 10/1949 | Radtke | 74/532 X |
| 2,620,055 | 12/1952 | Fasulo | 74/710.5 X |
| 2,876,658 | 3/1959 | McColl | 74/710.5 |
| 3,292,720 | 12/1966 | Harvey | 74/710.5 X |

*Primary Examiner*—Benjamin W. Wyche
*Assistant Examiner*—Frank H. McKenzie, Jr.
*Attorney, Agent, or Firm*—John C. Thompson

[57] ABSTRACT

A control mechanism for shifting the differential lock mechanism of a vehicle between unlocked and locked positions. The differential lock is hydraulically operated and is controlled by a two position hydraulic valve. A control link extends from the hydraulic valve to the control mechanism. When the control link is disposed in a retracted position the differential lock will be disposed in an unlocking position, and when the control link is disposed in an extended position the differential lock will be in its locking position. The control mechanism includes a pivoted cam-like member and a pivoted catch member provided with cooperating surfaces, biasing means operable to bias the cam-like member to a retracted position and actuator means operable to shift the cam-like member away from its retracted position through engaged and stop positions to a release position. The cooperating surface means on the cam-like member and pivoted catch are operable to stop the movement of the cam-like member in its stop position as the cam-like member is shifted away from its retracted position upon an initial application of force, to hold the cam-like member in the engaged position as the cam-like member is biased away from the stop position after the discontinuance of the initial application of force, to permit the cam-like member to be shifted through the stop position to the release position upon a subsequent application of force, and to then permit the cam-like member to be returned to its retracted position by the biasing means after the discontinuance of the subsequent application of force.

9 Claims, 13 Drawing Figures

CONTROL MECHANISM

The present invention relates generally to a control mechanism for the differential lock of a vehicle, and more particularly to a project-retract mechanism which will position a control link in an extended position upon a first application of force, and will then cause the control link to be disposed in a retracted position after a subsequent application of force.

The driving wheels of the vehicle are customarily driven through a differential gear mechanism so that the drive wheels may rotate at different speeds when the vehicle is turning. However, in many situations it is desirable to provide a differential lock so that both driven wheels of the vehicle are driven in locked relationship. For example, in an agricultural tractor a locked differential provides extra tractor pull when the traction is poor under one of the drive wheels. This condition may exist in wet soil, frosty soil, on ice or manure covered soil or when working across slopes. The differential is most commonly locked when plowing with one drive wheel in the furrow. Various forms of differential locks are well known in the art. However, in an agricultural tractor it is desirable to employ a differential lock which may be engaged or disengaged at any time. One such form utilizes a hydraulically operated friction clutch which is controlled through a two position hydraulic valve wherein the valve is either disposed in a first position to lock differential, or in a second position where the differential is not locked. A control mechanism in the operator's station of the vehicle is customarily interconnected with the valve through a control link. The control mechanism in the prior art has taken many different forms, however, it is desirable that the differential lock can be forced into engagement quickly and be moved out of engagement simply and easily.

An object of the present invention is to provide an actuating mechanism for a different lock that locks and unlocks the differential lock conveniently and easily.

Another object of the invention is to provide an actuating mechanism that operates a differential lock and moves to the unlocked position in a simple manner.

Other objects and advantages of this invention will be apparent to those skilled in the art after a consideration of the following detailed description taken in conjunction with the accompanying drawing in which a preferred form of this invention is illustrated.

Figure 1:
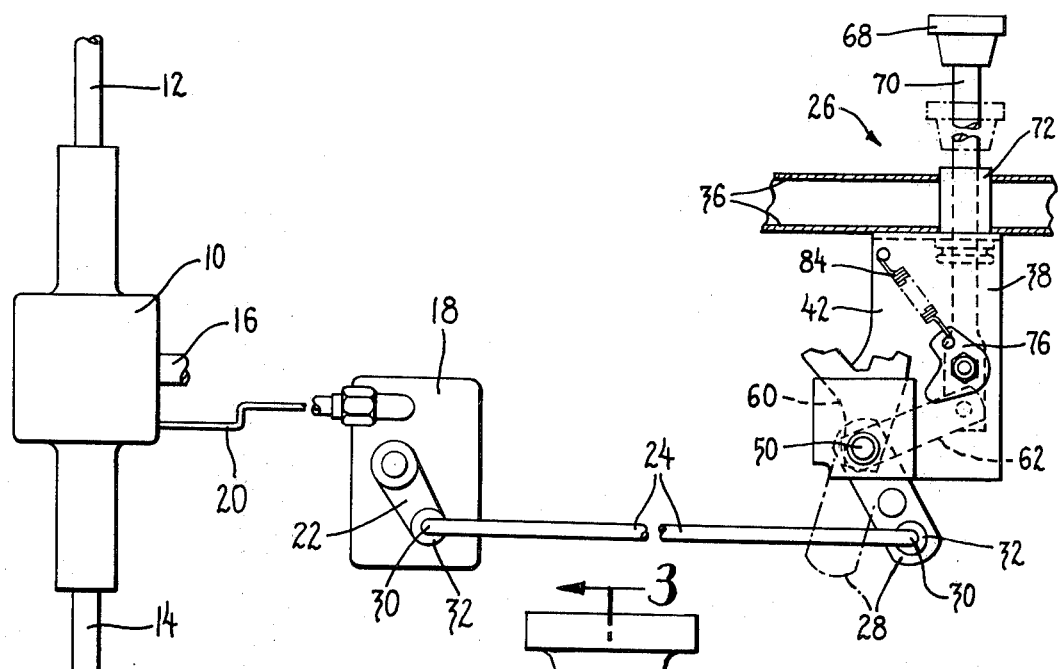
FIG. 1 is a view showing a portion of a vehicle including a differential housing, a hydraulic valve interconnected with a differential lock within the differential housing, and the actuating or control mechanism.

Referring first to FIG. 1, a portion of a vehicle such as an agricultural tractor is illustrated, the vehicle having drive means including a differential housing 10 connected to axles 12 and 14, the axles in turn driving wheels (not shown). An input shaft 16 is coupled to the gearing within the differential housing 10, the input shaft in turn being driven by a motor (not shown). A differential lock mechanism is disposed within the housing 10, the differential lock employed in the illustrated design being a conventional multiple plate hydraulically operated friction clutch which, when engaged, locks out the differential action of the gearing to cause both axles 12 and 14 to rotate together. When the hydraulically operated clutch is disengaged a differential action between the axles 12 and 14 may take place. The hydraulic actuation of the differential lock is controlled by a valve 18 which is interconnected with the differential lock by a conduit 20. The hydraulic valve means 18 is in turn connected to the hydraulic system (not shown) of the tractor in a manner not material to the present invention. The valve 18 can be shifted between two positions and this is controlled by a crank 22 on the valve, the position of the crank 22 being determined by extension or retraction of a control link 24. The disposition of the control link is in turn determined by the control mechanism of this invention which is indicated generally at 26, the control mechanism including a crank 28. The control link 24 has opposed L-shaped ends 30 which pass through suitable apertures in the cranks 22 and 28, the L-shaped ends being held in place by washers 32 and cotton pins 34.

In this embodiment the control mechanism 26 is attached to the floor structure 36 of a tractor cab. The control mechanism includes a sheet metal frame indicated generally at 18, the frame including an upper horizontal portion 40 (FIG. 3) which underlies the floor 36 and which is secured thereto in a conventional manner. The frame also includes a generally vertically extending structure 42, the lower end of which is formed into a U-shape having horizontally spaced apart vertical legs 44, 46 and a bight portion 48. Concentric apertures are formed in the leg portions 44, 46 and a rock shaft 50 is supported therein by spaced apart bearings 52, 54. A tubular member 56 is disposed about the shaft 50 and is secured thereto by pin means 58. A first pivoted member, namely a cam-like member 60, is secured to the tubular member by welding or the like, the cam-like member being disposed adjacent the leg 44. One end of a rock arm 62 is secured to the end of the rock shaft 50 disposed on the other side of the leg 44. One end of spring biasing means passed through an aperture 66 in an intermediate portion of the rock arm 62 (FIG. 2), the other end of the spring 64 being secured to an eye 69 formed on the horizontal portion 40. The biasing means 64 biases the cam-like member toward its retracted position shown in FIG. 2.

Actuator means are provided which are operable upon the application of force in one direction to shift the cam-like member away from its retracted position against the biasing means, the actuator means including a foot pedal 68 mounted on one end of a rod 70 which is received within a tubular guide 72, the other end of the rod being secured to the end of the rock arm 62 remote from the rock shaft 50 by a pivot pin assembly indicated generally at 74. As the force is applied in one direction the foot pedal may be shifted from the full line position shown in FIG. 1 to the dotted line position.

Figure 5:
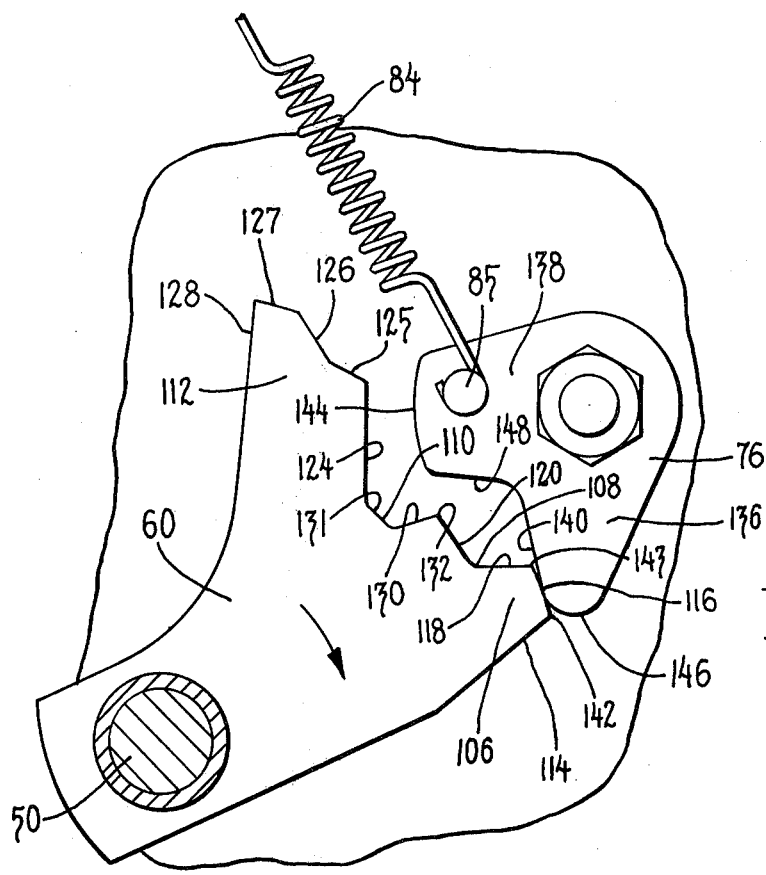
FIG. 5 is a partial side view of the control mechanism showing a further position of the cam-like member and catch.

A second pivoted member is mounted on the vertical structure 42, the second pivoted member being a pivoted catch or pawl 76. The catching means 76 is pivoted on a shouldered nut 78 which is in turn mounted on a bolt 80. A washer 82 is disposed between pawl 76 and the vertical structure 42. A spring 84 extends between a post 85 on the pawl 76 and a post 86 on the vertical structure 42, the spring 84 serving to maintain the pawl in the normal position shown in FIG. 2. If, however, the pawl is rotated away from its normal position, as for example to the position shown in FIG. 5, it should be obvious that the spring will bias the pawl back to its normal position.

Figure 2:
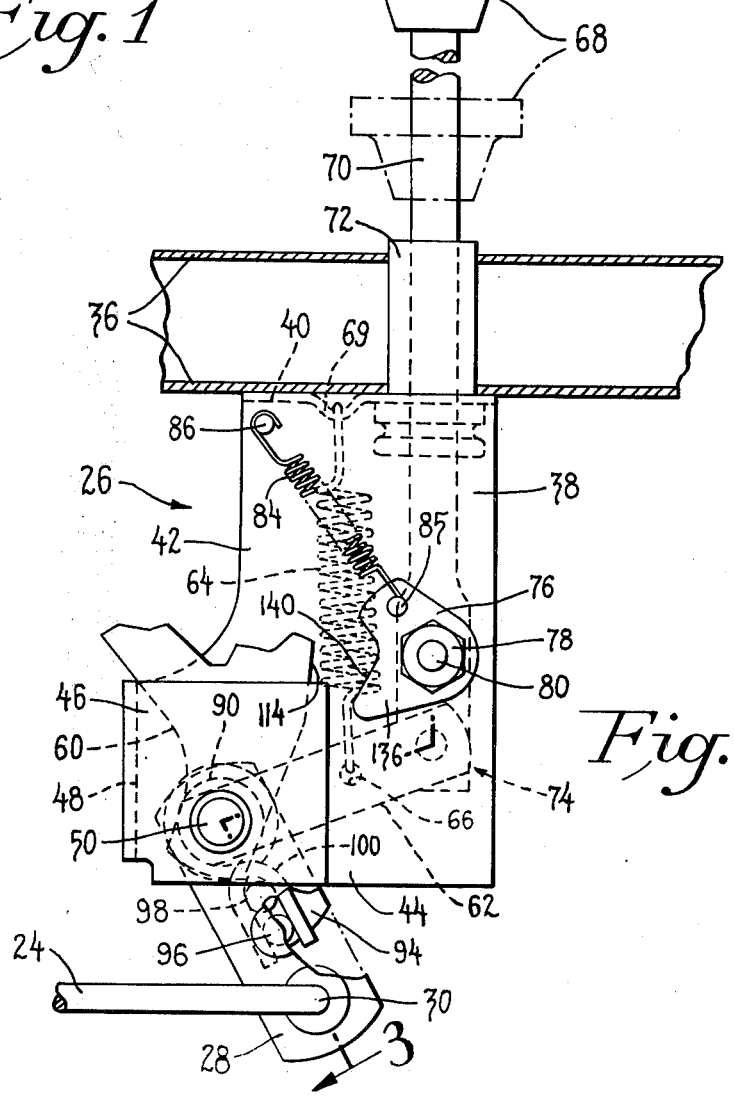
FIG. 2 is an enlarged detail view of the control mechanism shown in FIG. 1, the control mechanism being disposed in the unlocked or retracted position.
Figure 3:
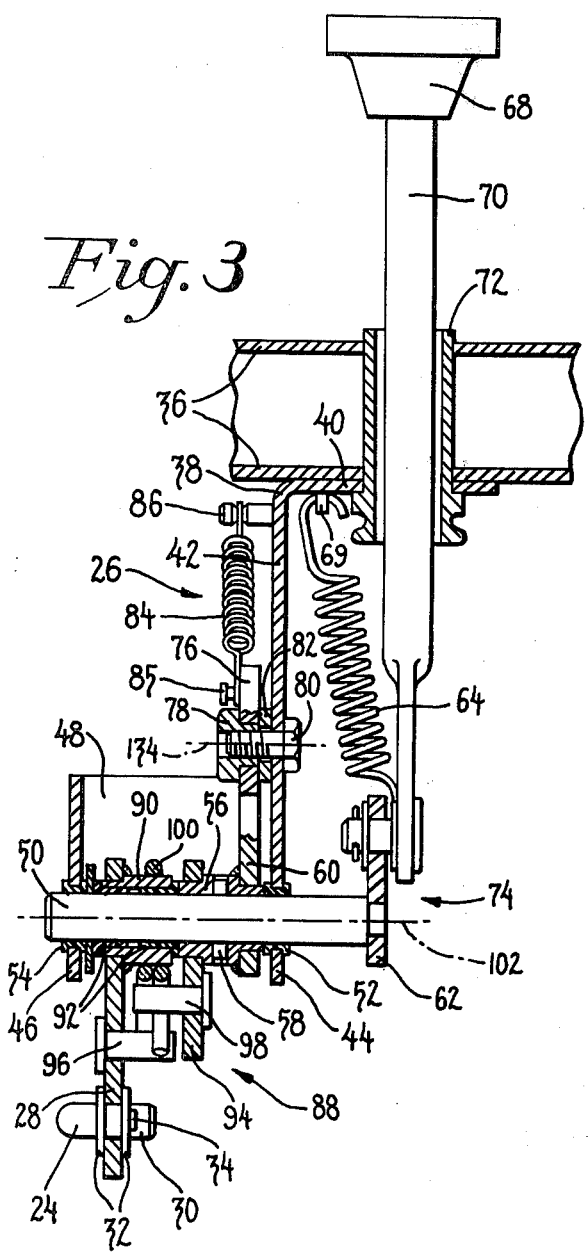
FIG. 3 is a cross-sectional view taken along the line 3—3 of FIG. 2.

The cam-like member 60 is interconnected with the control link by a crank assembly indicated generally at 88 in FIG. 3, the crank assembly including a spring mechanism in the nature of a lost motion mechanism. The crank assembly includes a sleeve 90 which is journaled by bearings 92 for rotational movement about the rock shaft 50. The crank 28 is secured to the sleeve 90 and rotates with the sleeve. Another crank 94 is secured to the sleeve 56 for rotational movement with the sleeve 56. Each of the cranks 28, 94 supports a pin 96, 98 respectively which projects towards the other crank. A helical spring 100 having a single convolution and spaced apart legs (as best shown in FIG. 2) is provided, the helical portion of the spring being disposed about the sleeve 90, and the leg portions of the spring 100 being disposed about either side of the pins 96, 98. The spring 100 will normally maintain the pins 96, 98 in radial alignment with each other, but will permit the crank 94 to continue to rotate in a clockwise direction (as viewed in FIG. 2) after the control link 24 has atained its fully extended position.

It should be apparent from the above that as the pedal 68 is moved downwardly as shown in FIG. 2 from the full line position to the broken line position that the crank 94 will be rotated in a clockwise direction which will cause attendant rotational movement of the crank 28 to cause the control link to be moved from its retracted position shown in full lines in FIG. 1 to its extended position shown in broken lines. If during such movement the control link 24 cannot move further to the left as viewed in FIG. 1, the spring 100 will permit further movement of the crank 94 without attendant movement of the crank 28.

The first and second pivoted members 60, 76 are provided with cooperating surface means. These cooperating surface means will enable the operator of the vehicle to step upon the pedal once to cause the control link 24 to be disposed in the projected or extended position, and to step upon the pedal a second time to cause the parts to be returned to their retracted position.

The cam-like means or member 60 is of generally a pie shape having a contoured operating surface remote from the axis 102. The operating surface includes a first projection 106, a holding portion or notch 108, a releasing portion or notch 110, and a second projection 112. The first projection 106 is defined by a leading surface 114, a top surface 116, and a trailing surface 118. The holding notch is defined by the intersection of the trailing surface 118 and a cylindrical surface 120, the axis of which corresponds to the axis 102 of the cam-like member 62. The second projection is defined by a stop surface 124, an upper surfaces 125, 126, 127 and a second trailing surface 128. The releasing notch is defined by an inwardly extending surface 130, another cylindrical surface 131 and the stop surface 124, the juncture of the cylindrical surface 120 and the inwardly extending surface 130 being referred to as the heel 132.

The second pivoted member which rotates about the axis 134 of the nut and bolt 78, 80 has two leg portions 136, 138, the leg 136 being referred to as the leading leg and the leg 138 being referred to as the stop leg.

Figure 4:
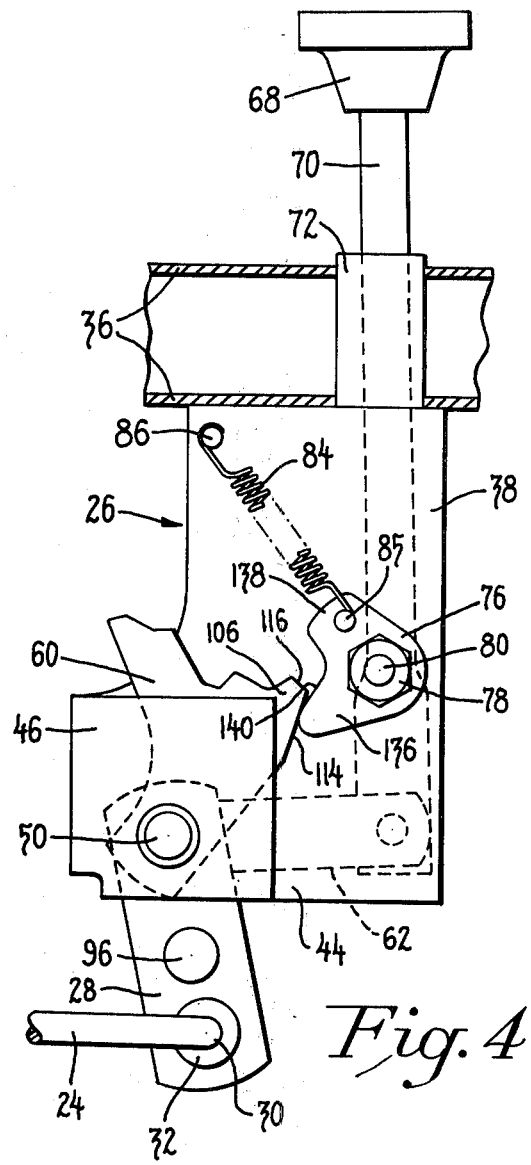
FIG. 4 is a side view of the control mechanism with the catch initially engaging the cam-like member.
Figure 6:
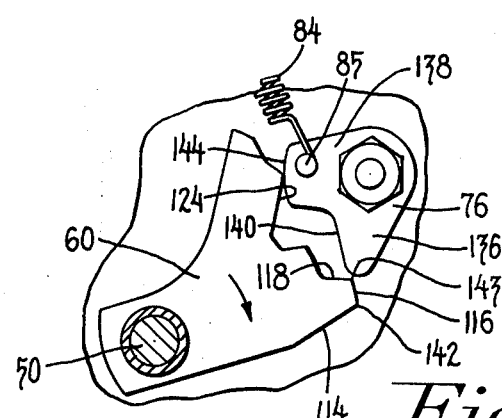
FIGS. 6 through 13 are views similar to FIG. 5 showing additional positions of the cam-like member and catch.
Figure 7:
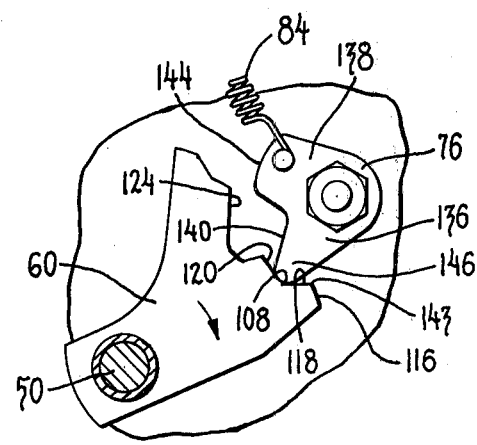

In operation, referring first to FIG. 2, when the operator initially steps upon the pedal 68 to move the pedal and push rod downwardly from the full line retracted position towards the dotted line position the cam-like member 60 will be caused to be rotated in a clockwise direction until the leading surface 114 engages the leading surface 140 of the catch 76 as shown in FIG. 4. Continued clockwise movement of the cam-like member 60 will cause the parts to ride along each other until they reach the position shown in FIG. 5 at which point the leading surface 140 will pass over the apex 142 defined by the intersection of the leading surface 114 and the top surface 116 and will then slide along the top surface 116. It should be noted that when the pawl is in the position shown in FIG. 5 that the spring 84 will be biasing the pawl 76 in a clockwise direction. As the leading surface passes over the edge 143 defined by the intersection of the top surface 116 and trailing surface 118 the pawl 76 will start to rotate to its normal position shown in FIG. 2 due to the actionof the spring 84. However, the parts are so arranged and constructed that due to the inertia of the pawl it cannot resume its normal position before continued movement of the cam-like member catches the stop surface 144 on the leg 138 with the stop surface 125 on the cam-like member, this position being illustrated in FIG. 6. Thus, the surfaces on the two pivoted members 60, 76 operate to stop the movement of the cam-like member in its stop position shown in FIG. 6 as the cam-like member is being shifted away from its retracted position upon the initial application of force in the first or downward direction. At this point the operator will then remove his foot from the pedal 68. The spring 64 will then bias the cam-like member away from the stop position towards the engaged position shown in FIG. 7. As this movement takes place the stop surface 124 will move away from the stop surface 144 permitting the spring to again rotate the pawl until the projection or apex 146 of the leading leg engages the cylindrical surface 120. Continued biasing force of the spring 64 will then cause the apex 146 to ride along the surface 120 until it engages the holding notch 108 defined by the intersection of the surface 120 and the trailing surface 118. This position is illustrated in FIG. 7. Thus, it can be seen that the surfaces of the first and second pivoted members 60, 76 will hold the cam-like member in the engaged position as the cam-like member is biased away from the stop position after the discontinuance of the initial application of force.

Figure 8:
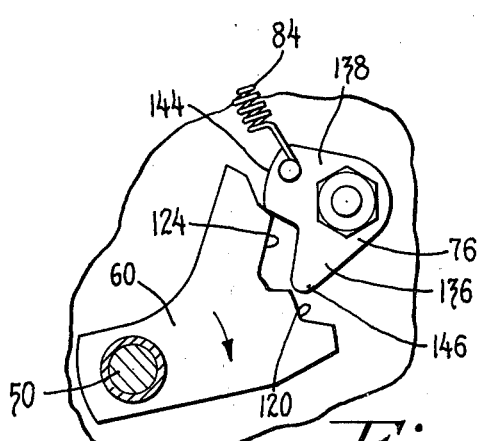
Figure 9:
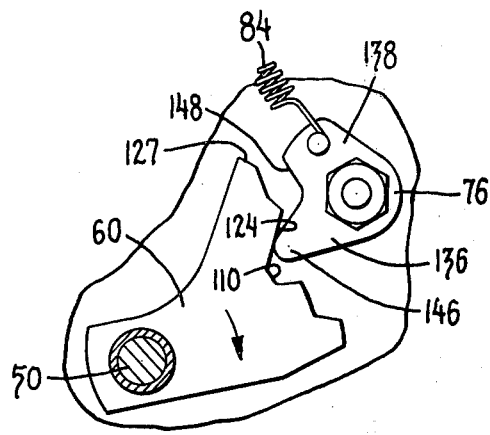
Figure 10:
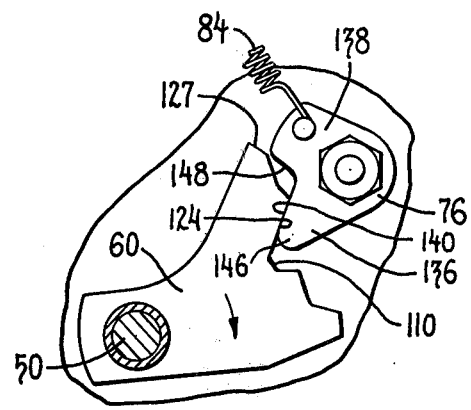
Figure 11:
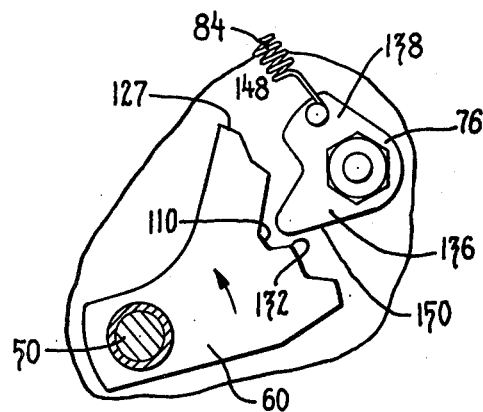
Figure 12:
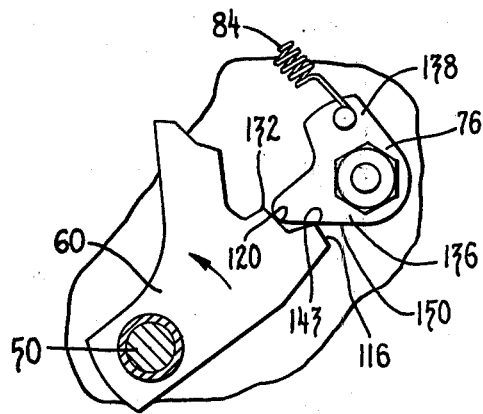
Figure 13:
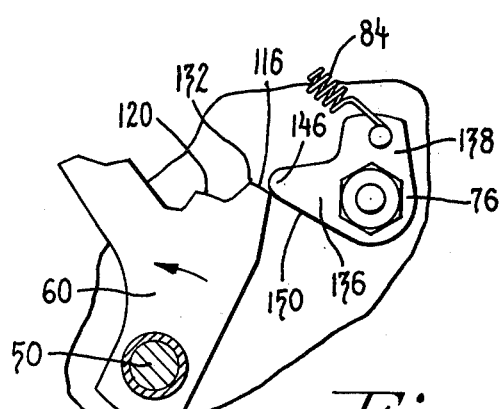

If the tractor operator then wishes to disengage the differential lock it is only necessary for him to again step upon the pedal 68. This will cause the cam-like member 60 to again rotate in a clockwise direction from the position shown in FIG. 7 through the positions shown first in FIG. 8 and then FIG. 9 until surface 148 of the stop leg 138 engages the upper surface 127 of the second projection, at which point further movement will not be possible, this fully extended or release position being illustrated in FIG. 10. At this point the apex 146 of the catch overlies the recess of notch 110 so that if the operator then discontinues the application of force the notch can enter the recess (FIG. 11) as the spring 64 biases the cam-like member towards the retracted position. Further movement of the cam-like member by the spring will cause the surface 150 of the catch to initially pass over the heel 132, to slide along surface 120 (FIG. 12) to then pass over the edge 143 and to then slide along the top surface 116 until it obtains the position shown in FIG. 13. As the spring 64 continues the rotational movement of the cam-like member back to the initial position shown in FIG. 2 the pawl will finally clear the cam-like member and the parts will be returned to the initial position shown in FIG. 2. It can thus be seen that the surfaces are so designed so that a subsequent application of force to the pedal 68 would permit the camm-like member to be shifted through the stop position to the release position and then will permit the cam-like member to be returned to its retracted position by the biasing means after the discontinuance of the subsequent application of force.

While a preferred structure in which the principles of the present invention have been incorporated is shown and described above, it is to be understood that the invention is not to be limited to the particular details, shown and described above, but that, in fact, widely differing means may be employed in the practice of the broader aspects of this invention.

What is claimed is:

1. A control mechanism for shifting a control link for a hydraulically actuated differential lock mechanism between extended and retracted positions, comprising:

first and second pivoted members mounted for rotational movement about spaced apart axes and provided with cooperating surface means, the first pivoted member being a cam-like member shiftable from a retracted position through engaged and stop positions to a release position, and the second pivoted member being a pivoted catch member engageable by said first pivoted member and shiftable in response to movement of said first pivoted member;

lost motion means interconnecting the cam-like member and said control link, said lost motion means being operable to cause said control link to be shifted from its retracted position to its extended position as the cam-like member is shifted from its retracted position to its engaged position, said lost motion linkage further including means which permit the cam-like member to be shifted from its engaged position to its release position without attendant movement of the control link;

biasing means operable to bias the cam-like member towards its retracted position; and actuator means interconnected with said cam-like member and operable upon the application of force in one direction to shift the cam-like member away from its retracted position against said biasing means;

the cooperating surface means being operable to stop the movement of the cam-like member in its stop position as the cam-like member is being shifted away from its retracted position upon the initial application of force in said one direction, to hold the cam-like member in the engaged position as the cam-like member is biased away from the stop position after the discontinuance of the initial application of force, to permit the cam-like member to be shifted through the stop position to the release position upon a subsequent application of force in said one direction, and to then permit the cam-like member to be returned to its retracted position by the biasing means after the discontinuance of the subsequent application of force.

2. The control mechanism set forth in claim 1 in which the cam-like member is mounted on a shaft for rotation therewith, and wherein said lost motion means is a portion of a crank assembly further including a crank mounted on said shaft, one end of the control link being secured to an end portion of said crank.

3. The control mechanism set forth in claim 2 wherein said crank is free to rotate about said shaft, said lost motion means including a spring mechanism operable to normally cause the control link to shift from its retracted position to its extended position as the cam-like member is shifted from its retracted position to its engaged position.

4. The control mechanism set forth in claim 3 wherein said spring mechanism includes a helical spring having spaced apart ends and a convolution disposed about said shaft, the crank assembly further including first pin means carried by said crank and disposed between the ends of said spring, and a second crank rotatable with said cam-like means, said second crank being provided with second pin means disposed between the ends of said spring.

5. The control mechanism set forth in claim 1 wherein said actuator means is a foot pedal which is disposed in a raised position when the cam-like member is disposed in its retracted position, said cam-like member being secured to a shaft which is provided with rock arm means at one end thereof, the lower end of said foot pedal means being interconnected with said rock arm means to cause the cam-like member to rotate away from its retracted position as said foot pedal means is forced downwardly in said one direction by an application of force in a downward direction.

6. The control mechanism set forth in claim 1 in which the catch member is provided with a leading leg and a stop leg, and wherein the pivoted catch member is biased by spring means to a normal position.

7. The control mechanism set forth in claim 6 wherein the cam-like member is provided with first and second projections, the first projection of the cam-like member engaging a leading surface of the leading leg of the pivoted catch member to rotate said pivoted catch member away from its normal position as the cam-like member is shifted from its retracted position to its engaged position during an initial application of force in said one direction, and a stop surface of the second projection engaging a stop surface on the stop leg upon further movement of the cam-like member to its stop position.

8. The control mechanism set forth in claim 7 in which the cam-like member is further provided with a holding notch, the apex of the leading leg engaging the holding notch as the cam-like member is biased away from the stop position by said biasing means after the discontinuance of the initial application of force.

9. The control mechanism set forth in claim 8 in which said cam-like member is further provided with a releasing notch, the leading leg of the pivoted catch member entering the releasing notch as the cam-like member is shifted through the stop position to the release position upon a subsequent application of force in said one direction.

* * * * *